United States Patent
Tsai et al.

(10) Patent No.: US 7,685,499 B2
(45) Date of Patent: Mar. 23, 2010

(54) XOR CIRCUIT, RAID DEVICE CAPABLE OF RECOVERING A PLURALITY OF FAILURES AND METHOD THEREOF

(75) Inventors: Wen-Sen Tsai, Hsin-Chu (TW); Hung-Chi Lin, Hsin-Chu (TW); Feng-Sheng Chu, Hsin-Chu (TW)

(73) Assignee: Accusys, Inc. (TW)

( * ) Notice: Subject to any disclaimer, the term of this patent is extended or adjusted under 35 U.S.C. 154(b) by 926 days.

(21) Appl. No.: 11/472,723

(22) Filed: Jun. 22, 2006

(65) Prior Publication Data

US 2006/0294416 A1 Dec. 28, 2006

(30) Foreign Application Priority Data

Jun. 22, 2005 (TW) .............................. 94120864 A

(51) Int. Cl.
*G11C 29/00* (2006.01)
(52) U.S. Cl. .................... 714/770; 714/6; 714/801; 711/114; 710/52
(58) Field of Classification Search ........... 714/6, 714/770, 801; 711/114; 710/52
See application file for complete search history.

(56) References Cited

U.S. PATENT DOCUMENTS

| | | | |
|---|---|---|---|
| 5,333,143 A | 7/1994 | Blaum et al. | |
| 5,499,253 A | 3/1996 | Lary | |
| 5,579,475 A | 11/1996 | Blaum et al. | |
| 5,644,695 A | 7/1997 | Blaum et al. | |
| 5,671,349 A | 9/1997 | Hashemi et al. | |
| 5,875,458 A * | 2/1999 | Niijima et al. | 711/114 |
| 6,148,430 A | 11/2000 | Weng | |
| 6,161,165 A * | 12/2000 | Solomon et al. | 711/114 |
| 6,185,697 B1 * | 2/2001 | Shiraishi | 714/6 |
| 6,321,358 B1 | 11/2001 | Anderson | |
| 6,526,477 B1 * | 2/2003 | Yuan et al. | 711/114 |
| 6,704,838 B2 | 3/2004 | Anderson | |
| 6,848,022 B2 | 1/2005 | Nanda | |
| 7,103,830 B1 | 9/2006 | Dong | |
| 7,127,668 B2 * | 10/2006 | McBryde et al. | 714/801 |
| 7,395,358 B2 * | 7/2008 | Mills et al. | 710/5 |
| 2002/0059539 A1 | 5/2002 | Anderson | |
| 2003/0212727 A1 | 11/2003 | Macy et al. | |
| 2004/0260994 A1 | 12/2004 | Winograd et al. | |
| 2005/0108613 A1 | 5/2005 | Kobayashi | |
| 2005/0257083 A1 | 11/2005 | Cousins | |
| 2005/0289253 A1 | 12/2005 | Edirisooriya et al. | |
| 2006/0080505 A1 | 4/2006 | Arai et al. | |
| 2006/0123268 A1 | 6/2006 | Forhan et al. | |
| 2006/0123269 A1 | 6/2006 | Forhan et al. | |
| 2006/0123270 A1 | 6/2006 | Forhan et al. | |
| 2006/0123271 A1 | 6/2006 | Forhan et al. | |
| 2006/0123312 A1 | 6/2006 | Forhan et al. | |
| 2006/0156211 A1 | 7/2006 | Edirisooriya et al. | |

* cited by examiner

*Primary Examiner*—Guy J Lamarre
(74) *Attorney, Agent, or Firm*—Paul & Paul

(57) ABSTRACT

An XOR circuit, a RAID device which can recover several failures and method thereof are provided. A Galois field data recovery circuit having two or more sets of Galois Field engine circuits which are used in the XOR circuit, is one which can generate high efficient parity engine and high efficient flow data route and which at the same time correct the three or more failures during operation of the RAID device.

5 Claims, 17 Drawing Sheets

XOR CIRCUIT, RAID DEVICE CAPABLE OF RECOVERING A PLURALITY OF FAILURES AND METHOD THEREOF

FIELD OF THE INVENTION

The present invention relates to an XOR (exclusive OR) circuit, a RAID device capable of recovering a plurality of failures and the method thereof, particularly to a device which can efficiently generate parity information and can efficiently flow data via a route, and to a RAID device which can simultaneously debug at least three disk drive failures during operation.

BACKGROUND OF THE INVENTION

With respect to RAID (Redundant Arrays of Inexpensive Disks) data storage device, a fast calculation of parity is needed to achieve the optimizing performance. In FIG. 1(a), a conventional RAID data storage device is shown and contains a host 111, a RAID controller 112 and a disk array 113 which is consisted of two or more disk drives 1131. The conventional RAID data storage device is moving bulk data between the host 111 and the disk drives 1131, in which the RAID controller 112 is responsible to distribute the data across the disk drives 1131 and to generate parities or lost data. Please refer to FIG. 1(b), which is an operation flowchart of the conventional RAID data storage device. When the conventional RAID data storage device is moving bulk data between the host 111 and the disk drives 1131, the host 111 issues command to the RAID controller 112, and then the RAID controller 112 is responsible to take care of the request. The RAID controller 112 takes appropriate actions to satisfy the request at step 1152 of FIG. 1(b). The step 1152 is that the host 111 accesses the disk drives and issues command to the RAID controller 112. The response of the RAID controller 112 are described as follows:

For write operation, the host 111 intends to write data into the disk drives, the steps are as follow. Firstly, the host 111 gives the RAID controller 112 new data which were ready to be written to the disk drives 1131 at step 1155. At step 1155, the host 111 transfers new data to the RAID controller 112. Then, at step 1156, the RAID controller 112 performs XOR calculation to generate new parity and the RAID controller 112 writes the new data and new parity into the disk drives 1131.

For read operation, the host 111 intends to read data from the disk drives 1131, and the steps are as follow. At step 1153, the RAID controller 112 gets old data and old parity from the disk drives 1131, and then the RAID controller 112 performs XOR calculation to rebuild the lost data. To proceed to the step 1154, the host 111 takes back the wanted data.

In the above descriptions for the read operation, the assumption is that there is one disk failure. This assumption is applied to explain the techniques of the present application conveniently. In the text of the present application, the assumption that there is one disk failure is applied. Another assumption must be declared first that the transferring quantity for each request launched by the host is N data block.

Please refer to FIG. 2(a) which illustrates the data flow for write operation of the conventional RAID data storage device which contains a host 111, a host controller 1111, a DMA (direct memory access) controller 141, a local memory 142, an XOR circuit 143, a disk controller 144, an internal bus 145 for transferring commands and data, and a plurality of disk drives 1131. The XOR circuit 143 contains a buffer 1431, a multiplexer 1432 and a XOR component 1433. During the write operation, new N data are moved into the local memory 142 first (as the solid line), and then the XOR circuit 143 fetches data from the local memory 142 (as the dot line) and performs XOR calculation. The calculated new parity is pushed in buffer 1431 temporarily and then stored into the local memory 142 (as the dash-dot line). Finally, both new N data and new parity are written to the disk drives 1131 (as the dash line). The amount of using the internal bus 145 is 3N+2.

Please refer to FIG. 2(b) which illustrates the data flow for read operation of the conventional RAID data storage device. Old N−1 data and old parity are first read from the disk drives 1131 and saved into the local memory 142 (as the dash line). The XOR circuit 143 reads these old data and old parity from the local memory 142 (as the dot line) and performs XOR calculation to recover lost data. The recovered data is saved in the buffer 1431 temporarily and then stored into the local memory 142 (as the dash-dot line) for the host 111 to read. The amount of using the internal bus 145 is 3N+1.

Please refer to FIG. 2(c) which shows the RAID controller operational flowchart for a conventional method. Under such operational mechanism, the amount of using the internal bus 145 is 3N+2 for write operation and 3N+1 for read operation. However, the data moving between the host 111 and the local memory 142 is necessary. That is, the local memory 142 must be accessed at least twice with the data block that the host 111 intends to transfer. In this architecture of FIG. 2(a) and FIG. 2(b), we can presume that the performance would be declined rapidly while the amount of disk drives increased. Hence, in order to solve the above problem, the device and method of the present invention are provided.

SUMMARY OF THE INVENTION

It is another object of the present invention to provide an XOR circuit comprising:
an XOR DMA unit for accessing data from a DMA bus;
a plurality of Galois field data recovery circuits for generating a parity and recovered data by using Galois field arithmetic from old data in order to calculate the recovered data from lost data to output a Galois output data;
a first XOR component for inputting the Galois output data into the first XOR component from the Galois field data recovery circuits and having a first XOR output terminal and a plurality of first XOR input terminals to generate an XOR output data which are transferred to the XOR DMA unit; and
an XOR register set for controlling the XOR DMA unit by a control signal from a command bus.

In according with the present invention, the Galois field data recovery circuit comprises a plurality of Galois field data recovery units comprising:
a Galois field engine for executing Galois field multiplication and Galois field division and having an engine output terminal and an engine input terminal which is electrically coupled to the XOR DMA unit;
a second XOR component having a first component input terminal, a second component input terminal and a second XOR output terminal, wherein the first component input terminal is electrically coupled to the engine output terminal;
a multiplexer having a first multiplexer input terminal, a second multiplexer input terminal and a multiplexer output terminal, wherein the first multiplexer input terminal is electrically coupled to the engine output terminal and the second multiplexer input terminal is electrically coupled to the second XOR output terminal; and
an XOR buffer having a buffer input terminal and a buffer output terminal, wherein the buffer input terminal is electrically coupled to the multiplexer output terminal and the buffer output terminal is electrically coupled to the second component input terminal and the first XOR component input terminal, the XOR buffer is used for storing a parity and recovered data, the Galois field data recovery circuit is used for calculating multiple parity calculation.

Preferably, the XOR buffer is an SRAM.

According to another aspect of the present invention, there is provided a RAID device capable of recovering a plurality of failures comprising:

a host controller having a command register for receiving a host command;

at least one disk controller having a timing control register and an IDE port register;

an XOR circuit of claim 1 for executing XOR calculation;

a DMA controller for arbitrating direct access of an internal bus; and a local memory for storing a data from the internal bus.

In accordance with the present invention, the DMA controller has a DMA address register, count register and a plurality of control register.

According to another aspect of the present invention, there is provided a method of accessing data on a RAID device capable of recovering a plurality of failures comprising steps of:

(1) issuing an access request from an host device to a RAID controller;
(2) if the access request is write, then
(2a) copying new data into a local memory from the host device;
(2b) writing the new data into a plurality of disk drives;
(2c) obtaining the new data on an internal bus from the internal bus;
(2d) generating a new parity by an XOR circuit and storing in an XOR buffer;
(2e) storing the new parity into the local memory;
(2f) writing the new parity into a plurality of disk drives;
(3) if the access request is read, then
(3a) copying old data and old parities into the local memory from the disk drives;
(3b) obtaining the new data on the internal bus from the internal bus;
(3c) recovering lost data and storing recovered data into the XOR buffer;
(3d) storing the recovered data into the local memory; and
(3e) getting the old data and the recovered data from the local memory.

In accordance with the present invention, at step (2c) the new data on the internal bus are obtained from the internal bus by using the XOR circuit.

In accordance with the present invention, at step (2d) the new parity is generated and stored into the XOR buffer by using the XOR circuit.

In accordance with the present invention, at step (3d) the new data on the internal bus are obtained from the internal bus by using the XOR circuit.

In accordance with the present invention, at step (3c) the recovered data are recovered from the lost data and stored into the XOR buffer by using the XOR circuit.

Preferably, the host device is a personal computer.
Preferably, the host device is a server.
Preferably, the local memory is an SRAM.
Preferably, the disk drive is an ATA-133 hard-drive transferred via an IDE channel.
Preferably, the internal bus has a command bus and a DMA (direct memory access) bus.

In accordance with the present invention, at step (3e) the host device gets the old data and the recovered data from the local memory.

The foregoing and other features and advantages of the present invention will be more clearly understood through the following descriptions with reference to the drawings, wherein:

DETAILED DESCRIPTION OF THE PREFERRED EMBODIMENT

The present invention will now be described more specifically with reference to the following embodiments.

The present invention provides a so-called on-the-fly XOR (OTFXOR) calculation method. The main differences between the present invention and the prior art are the OTFXOR circuit and the data flow in acquiring the data intended to be calculated. Similar to the conventional method, the goal is to do parity calculation and data rebuilding. The operation mechanism is described as follows.

Figure 1A:
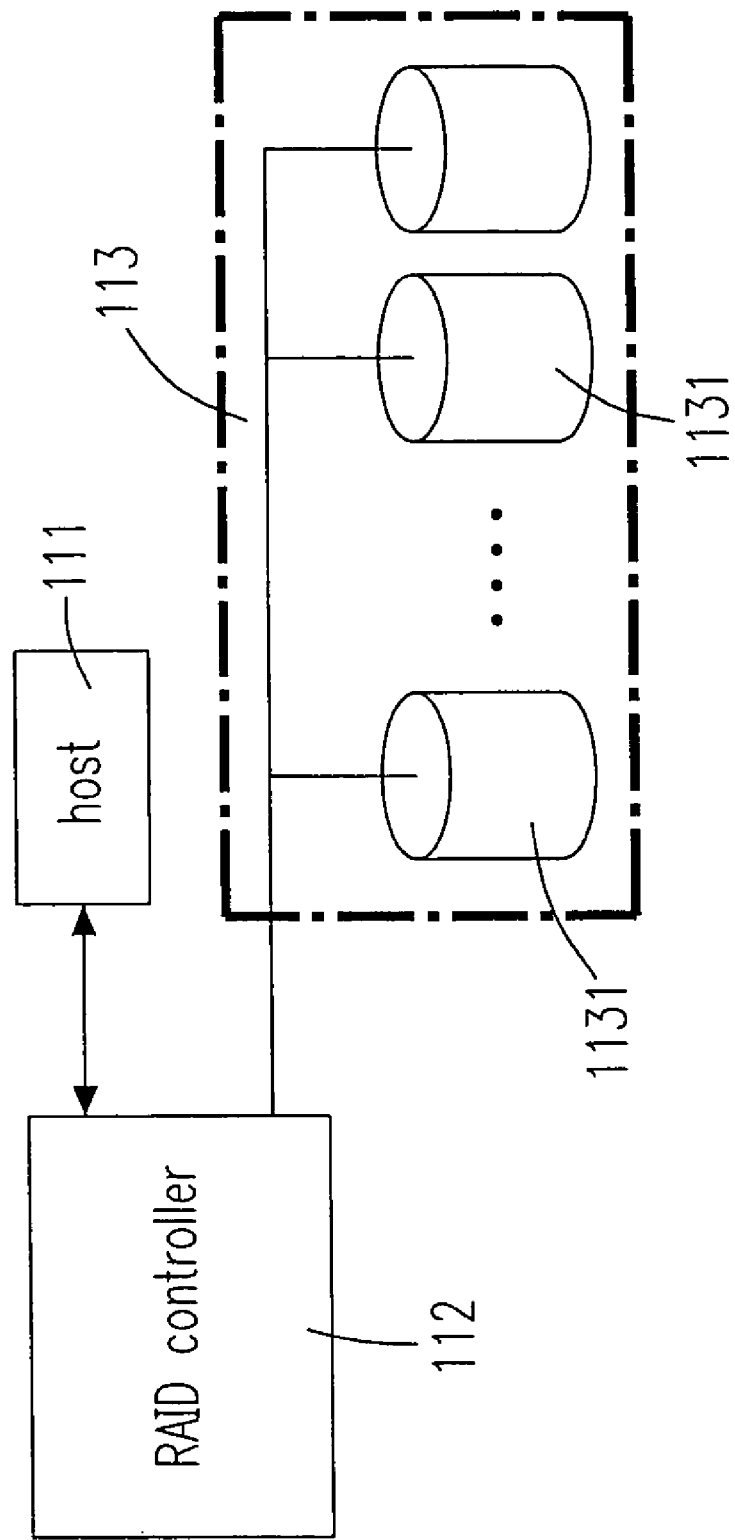
FIG. 1(a) is a circuit diagram showing a RAID data storage device according to the prior art.
Figure 1B:
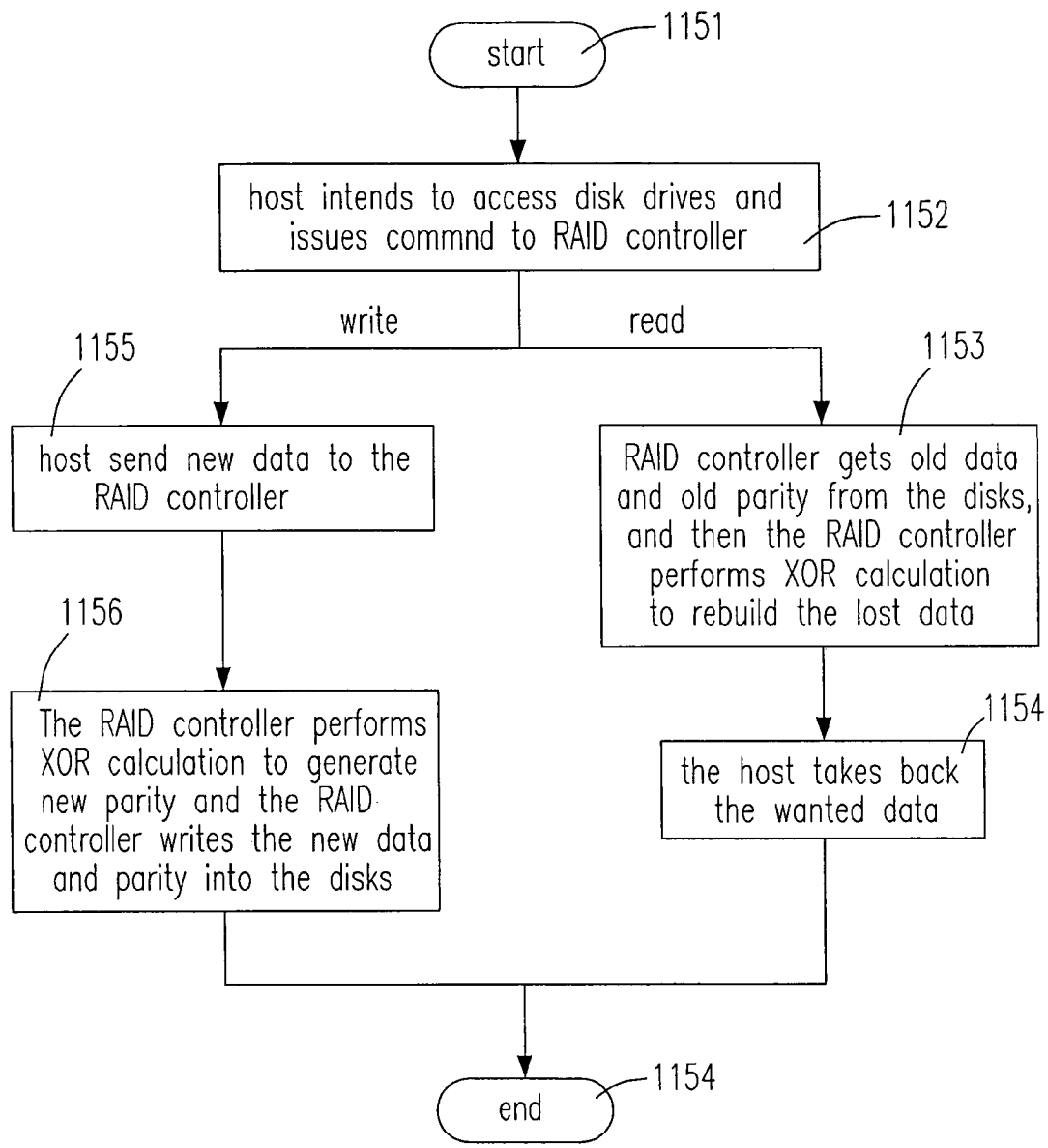
FIG. 1(b) is a flowchart diagram showing the operation of a RAID data storage device according to the prior art.
Figure 2A:
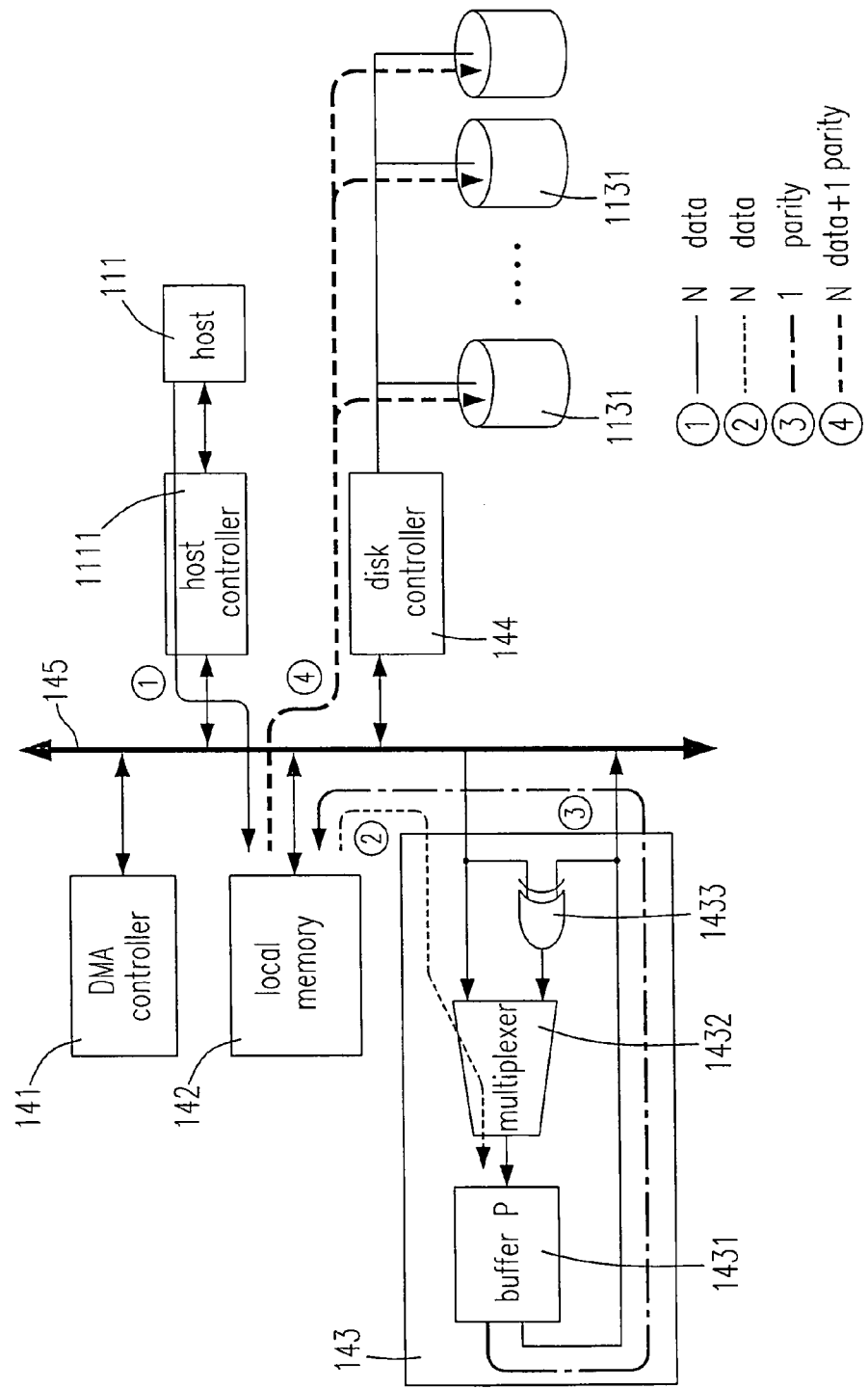
FIG. 2(a) is a schematic view showing data flow of a RAID data storage device during write operation according to the prior art.
Figure 2B:
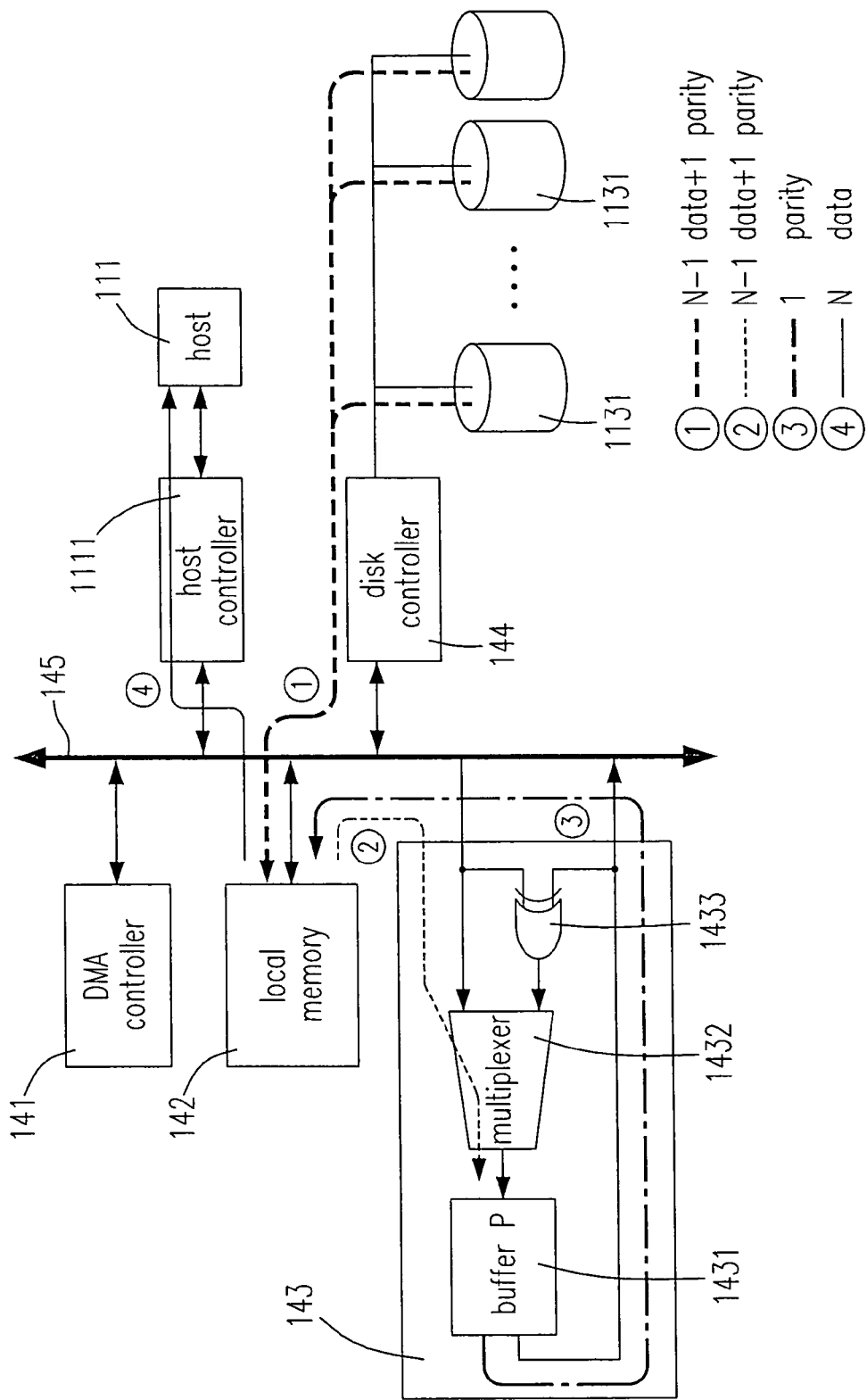
FIG. 2(b) is a schematic view showing data flow of a RAID data storage device during read operation according to the prior art.
Figure 2C:
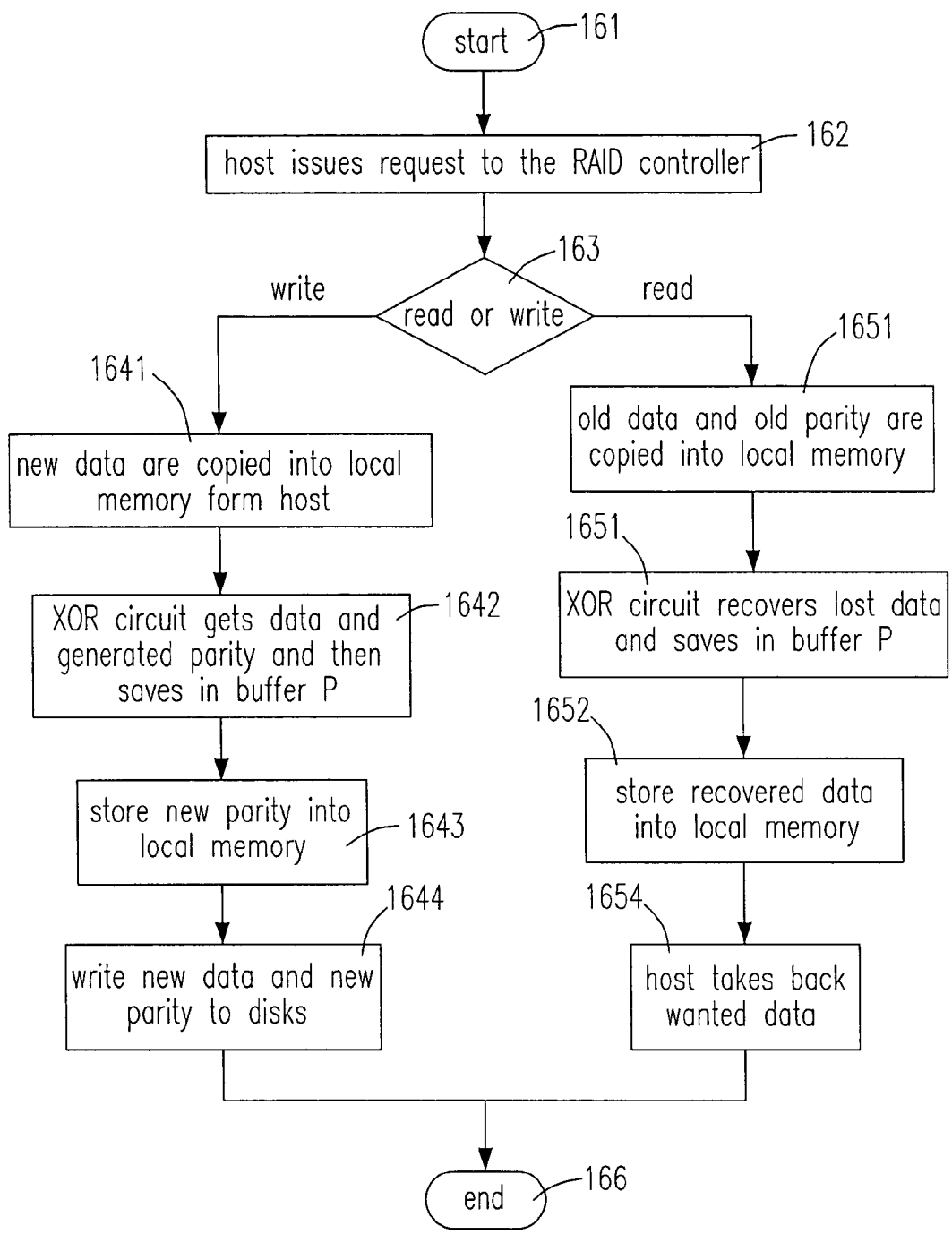
FIG. 2(c) is a flowchart diagram of operation of a RAID data storage device according to the prior art.
Figure 3A:
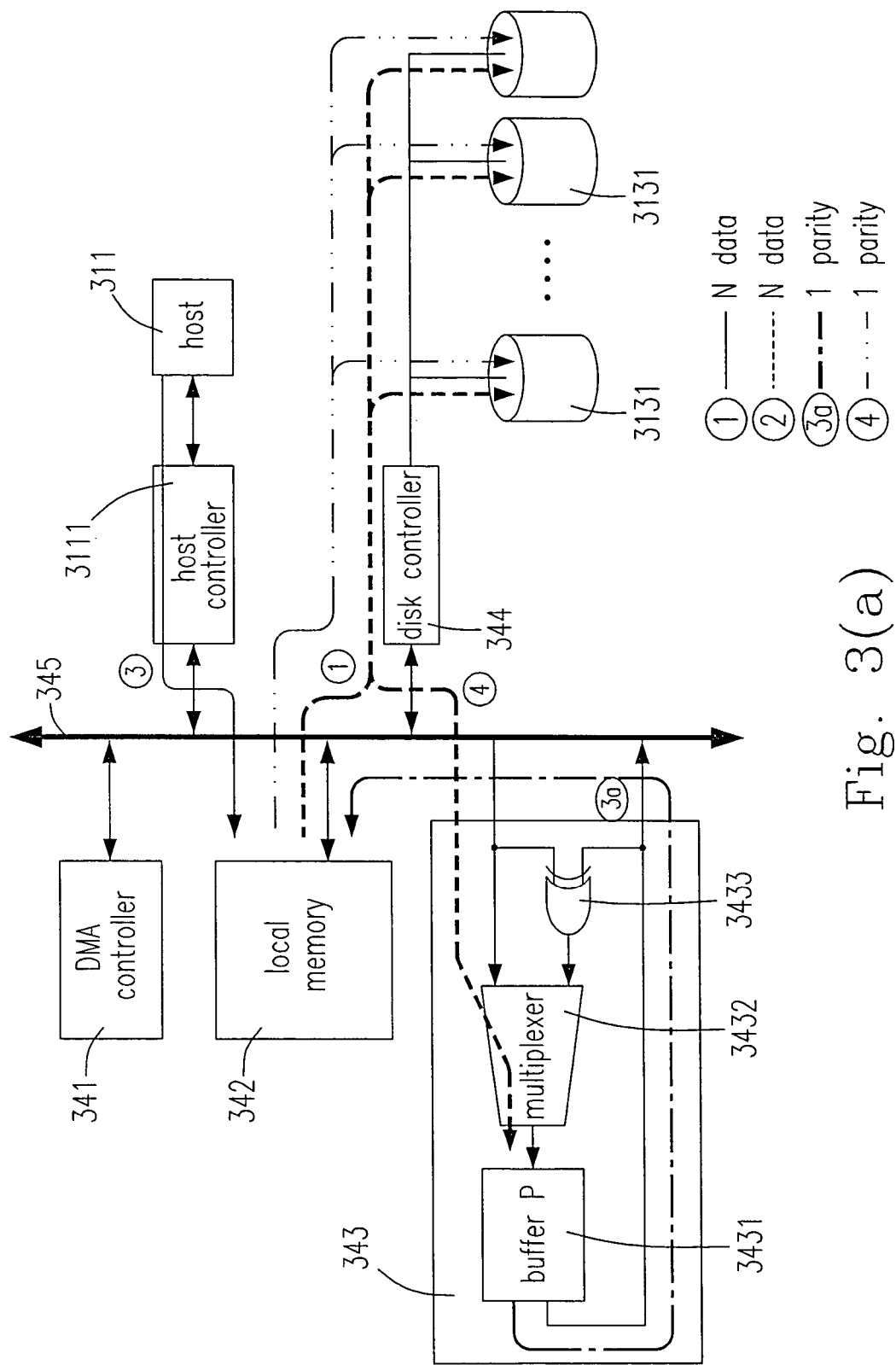
FIG. 3(a) is a schematic view showing the data flow of a RAID data storage device in a common mode during write operation according to the present invention.

In FIG. 3(a) which is a schematic view showing the data flow of a RAID data storage device in a common mode during write operation according to the present invention, for write operation, the host 311 moves new N data into local memory 342 (as the solid line) intended writing to the disks 3131. The OTFXOR circuit 343 of the present invention is configured to have the ability of acquiring the busing data on internal bus 345 while DMA controller 341 starts the transferring from the local memory 342 to disk drives 3131 (as the dash line). The on-the-fly fetched data are sent to OTFXOR circuit 343 to do parity calculation (as the dash line). The calculated new parity are stored in buffer P 3431 temporarily and then saved into the local memory 342 (as the dash-dot line). Finally, only new parity is written to disk drives 3131 (as the dash-dot-dot line). The amount of using internal bus 345 is 2N+2.

Figure 3B:
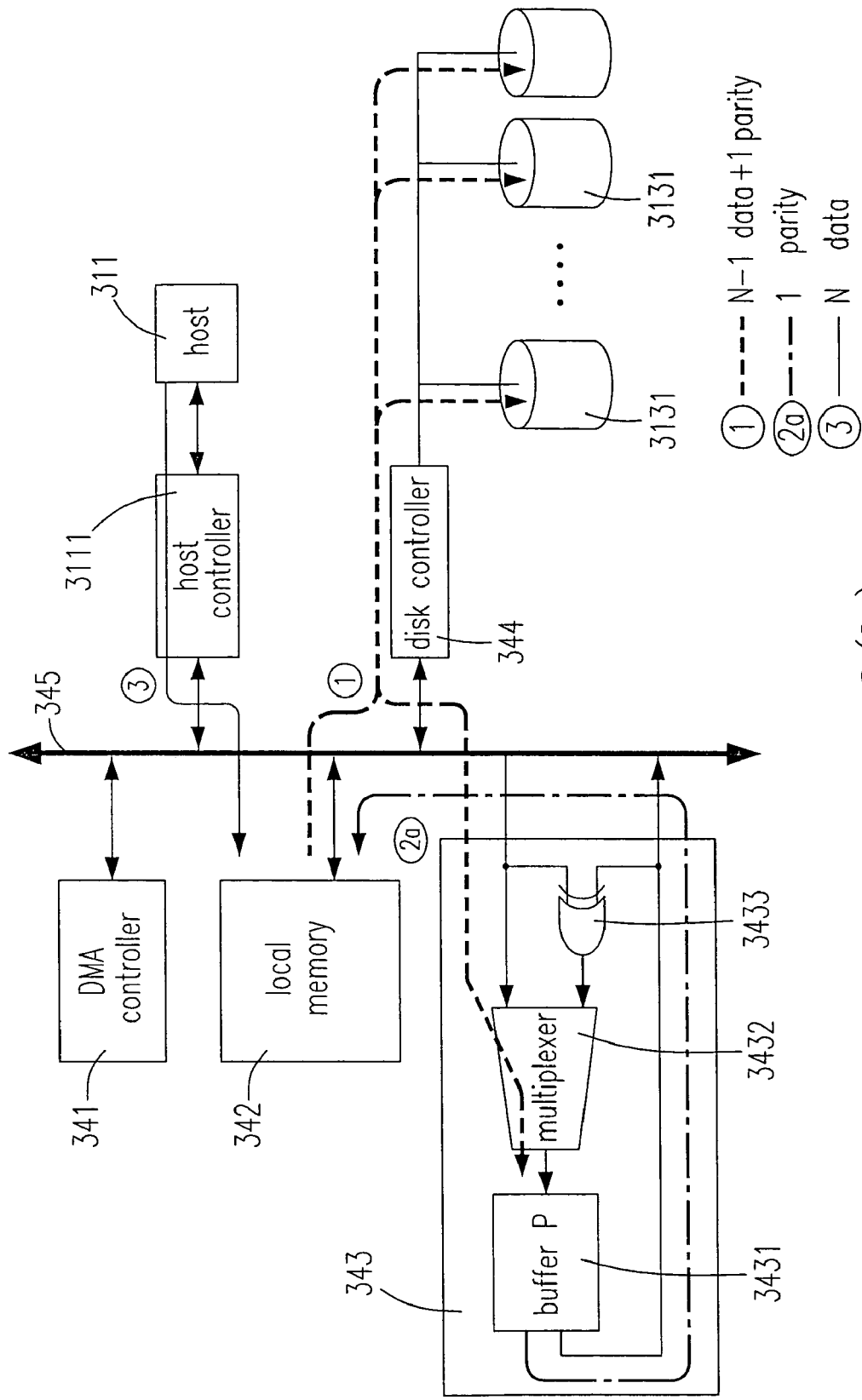
FIG. 3(b) is a schematic view showing data flow of the RAID data storage device in a common mode during read operation according to the present invention.

Please refer to FIG. 3(b) which is a schematic view showing data flow of the RAID data storage device in a common mode during read operation according to the present invention. In FIG. 3(b), for read operation, the DMA controller 341 is programmed to do old N−1 data transfer from disks 3131 to the local memory 342 (as the dash line). At the same time, the OTFXOR circuit 343 is configured to have the ability of acquiring the busing old N−1 data and old parity on the internal bus 345 (as the dash line) and performing XOR calculation to rebuild the lost data. The recovered data are saved in the buffer P 3431 temporarily and then stored into the local memory 342 for the host 311 to read (as the dash-dot line). The amount of using the internal bus 345 is 2N+1.

Figure 3C:
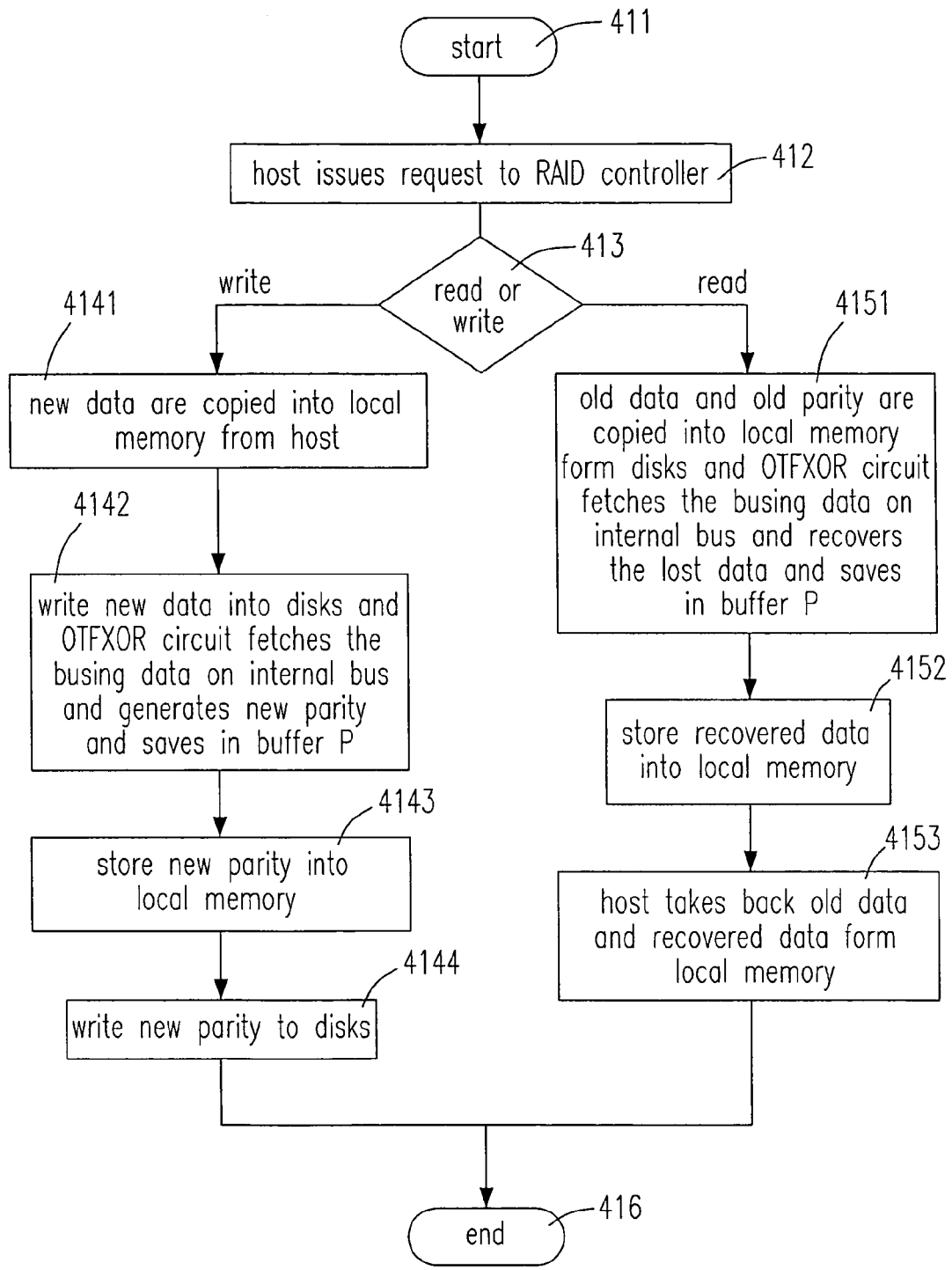
FIG. 3(c) is a flowchart diagram showing operational method of the RAID data storage device in a common mode according to the present invention.

Please refer to FIG. 3(c) which shows the data flow of a RAID data storage device in a common mode during write operation according to the present invention. The OTFXOR circuit is an XOR circuit having Galois filed engines. As shown in FIG. 3(c), after the start 411, at step 412, the host issues request to the RAID controller. At step 413 a read operation or a write operation is to be judged. If the write operation is chosen, then the process goes to the step 4141 and if the read operation is chosen, then the process goes to the step 4151. When the process goes to the write operation, at step 4141, new data are copied into local memory from host. At step 4142, new data are written into disks and the OTFXOR circuit fetches the busing data on internal bus and generates new parity and saves in buffer P. At step 4143, new parity is stored into local memory. At step 4144, new parity is written to disks. When the process goes to the read operation, at step 4151, old data and old parity are copied into local memory from disks and OTFXOR circuit fetches the busing data on internal bus and recovers the lost data and saves in buffer P. At step 4152, recovered data are stored into the local memory. At step 4153, host takes back old data and recovered data from local memory. Under such operational mechanism, the amount of using the internal bus 345 is 2N+2 for write operation and 2N+1 for read operation. However, the data moving between the host 311 and the local memory 342 is necessary. That is, the local memory 342 is only accessed nearly by the data blocks that the host 311 intends to transfer. In this architecture of FIG. 3(a) and FIG. 3(b), the performance is obviously increased even if the amount of disk drives increases.

Figure 4A:
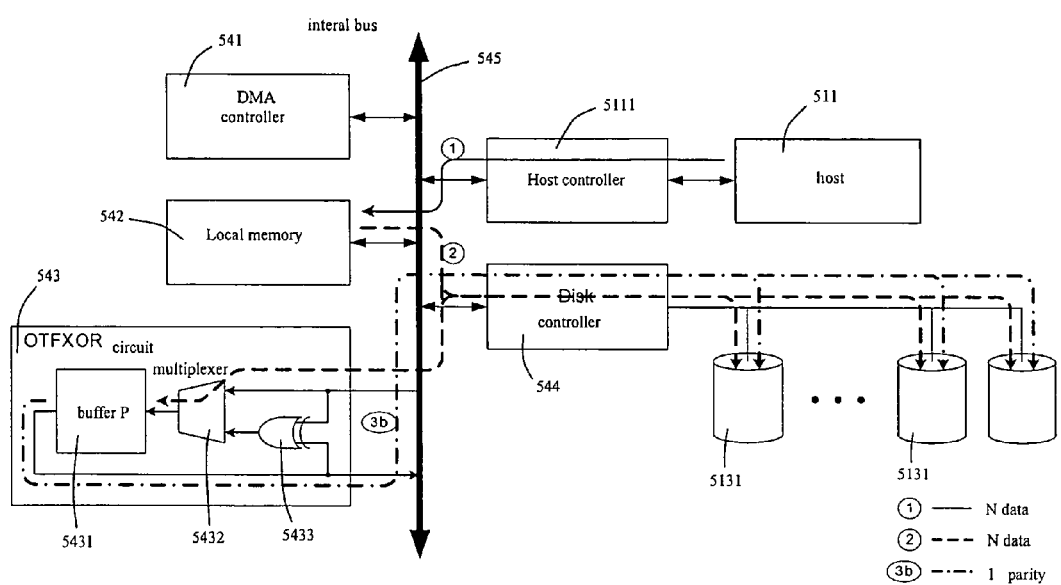
FIG. 4(a) is a schematic view showing data flow of a RAID data storage device in an optimizing mode during write operation according to the present invention.
Figure 4B:
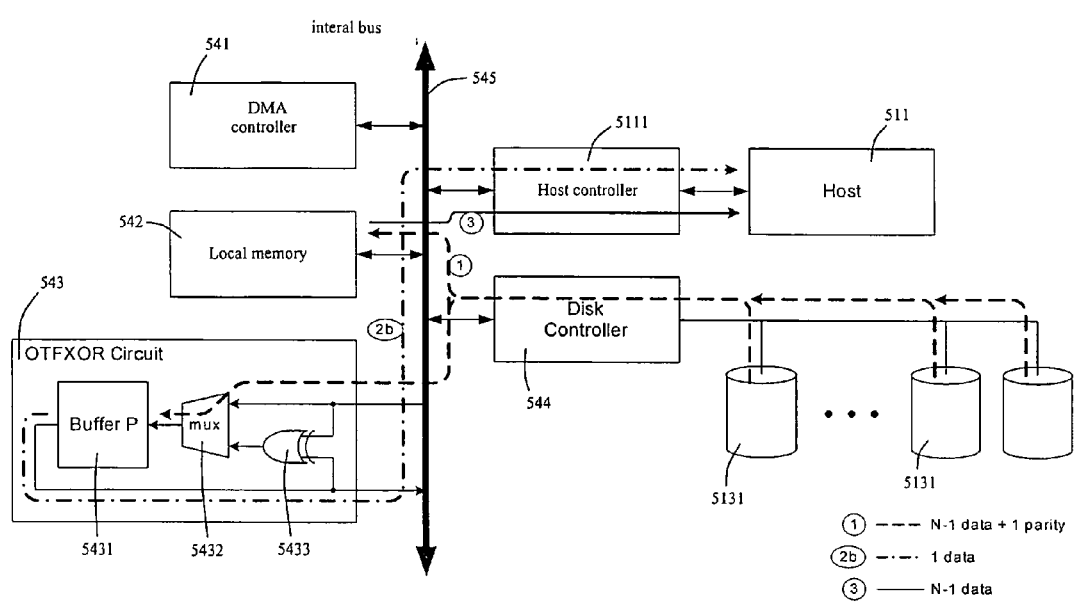
FIG. 4(b) is a schematic view showing data flow of the RAID data storage device in an optimizing mode during read operation according to the present invention.
Figure 4C:
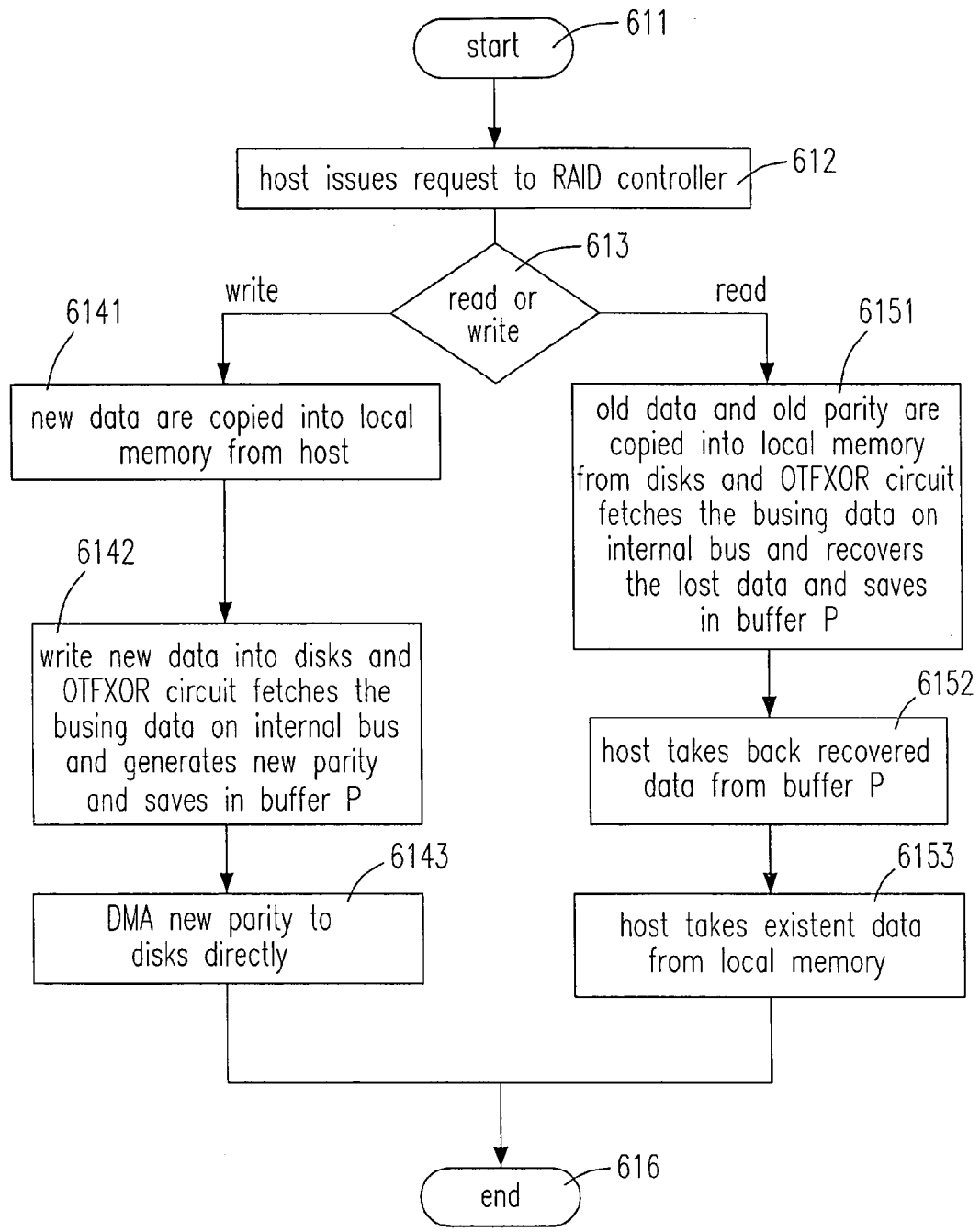
FIG. 4(c) is a flowchart diagram showing operational method of the RAID data storage device in an optimizing mode according to the present invention.

Please refer to FIG. 4(a). For optimizing performance, the OTFXOR circuit 543 can be the source to be activated to do DMA transferring of parity to the disk drives 5131 (as the dash-dot line shown in FIG. 4(a)) for write operation without the procedure of storing calculated parity back to local memory (as the dash-dot line shown in FIG. 3(a)). For read operation, when the data that the host intends to read are in the fault disk, a RAID controller has to get the other data and parity from the existent disks and performs recovery of lost data. Since the host 511 wants to take back the data in fault disks only which was buffered in buffer P 5431 after rebuilding action, it is not necessary to save the recovered data back to the local memory 542. The OTFXOR circuit 543 can be the source to perform DMA transferring of recovered data to the host 511 directly (as the dash-dot line shown in FIG. 4(b)). For this optimized method of read operation with accessing of lost data, of course the other old data can be read from the local memory 542 (as the solid line shown in FIG. 4(b)). The flowchart of the optimized method is depicted in FIG. 4(c). For operating in such mode, the amount of using internal 545 (including the amount of moving data between the host and local memory) becomes 2N+1 for write operation and 2N for read operation. The amount of using internal bus (including the amount of moving data between the host and local memory) can be reduced one time in accessing the local memory. It is beneficial to system performance directly.

Figure 5:
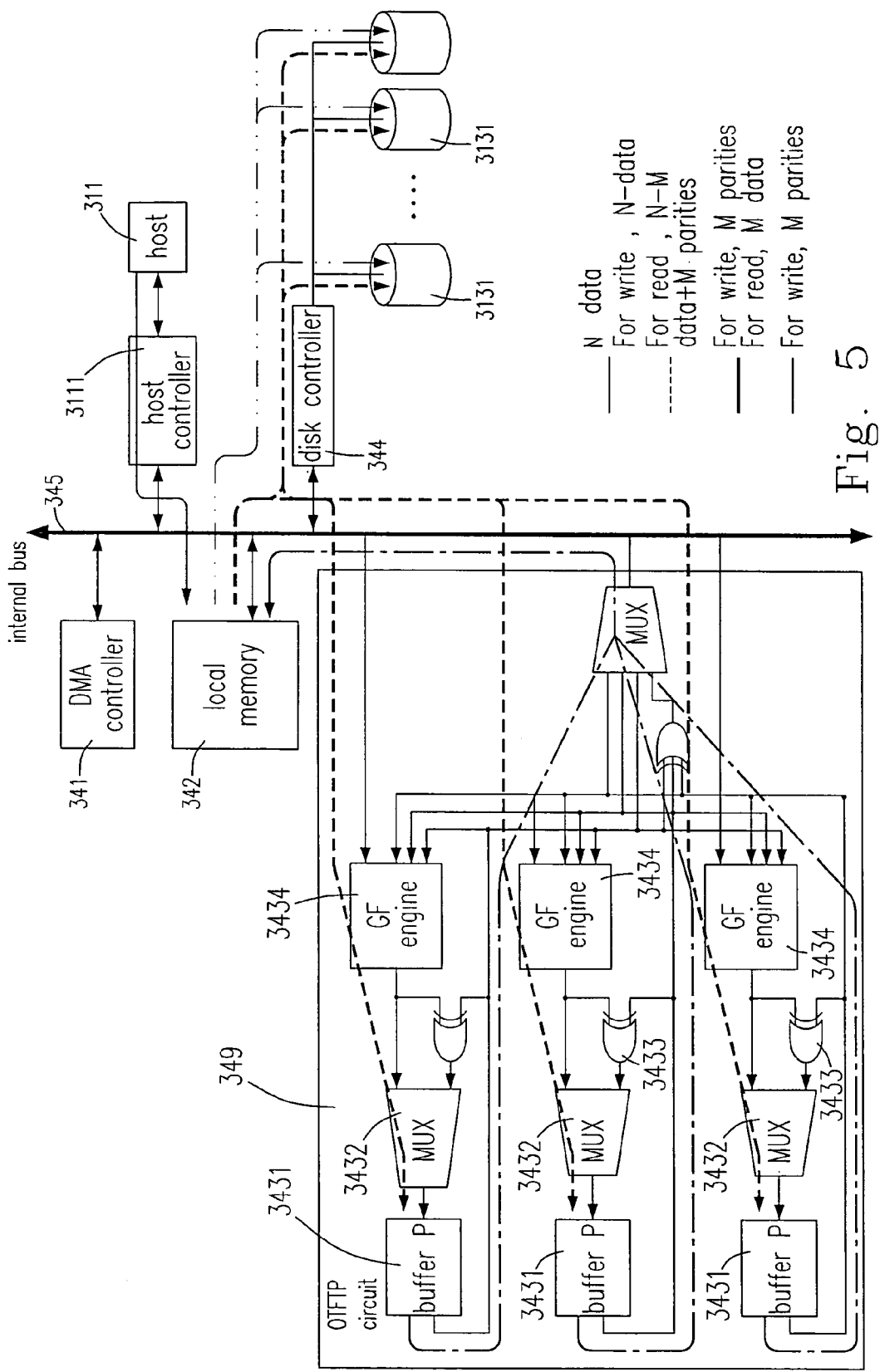
FIG. 5 is a circuit diagram of a preferred embodiment of a RAID data storage device according to the present invention.

Please refer to FIG. 5, which is a circuit diagram of a preferred embodiment of a RAID data storage device according to the present invention. In FIG. 5, an extended architecture based on the above improved proposal of the present invention is implemented. Our practical application is to implement a RAID controller with three parities calculating functionality based on the proposed on-the-fly XOR architecture to achieve tolerance of three disk failures. The architecture and operating mechanism are described as follows.

To reach three parity generation, the Galois Field (GF) arithmetic including Galois Field multiplication (GF multiplication) and Galois Field division (GF division) is used. In FIG. 5, the Galois Field engine (GF engine) 3434 is used to perform these two computations. Since the goal is to design an on-the-fly three parity (OTFTP) engine 349, it is necessary to prepare three buffers 3431 (Buffer P, Buffer Q, and Buffer R) to store three parities or recovered data. The operation of the on-the-fly three parity (OTFTP) engine 349 is similar to the OTFXOR 543. The OTFTP engine circuit 349 is configured to be capable of acquiring busing data on internal bus (as the dash line) while data are transferring between the local memory 342 and disk drives 3131. The calculated parities or recovered data are saved in the internal buffers separately and then stored into the local memory 342 (as the dash-dot line). Finally, the calculated parities are written to disks 3131 for write operation (as the dash-dot-dot line). For read operation, the recovered data are stored in the local memory 342 for the host 311 to read.

In this real application of FIG. 5, the amount of using internal bus is 2N+2M for write operation and 2N+M for read operation. However, the data moving between the host 311 and the local memory 342 is needed. In which, M means the amount of parity intended to be calculated for write operation or the amount of fault disks. In this practical implementation, the extensibility from on parity to multiple parities based on the proposed on-the-fly XOR approach is possible and practicable.

For optimizing performance, the OTFXOR circuit 394 can be the source to be activated to do DMA transferring of parity to the disk drives 5131 for write operation without the procedure of storing calculated parity back to local memory. For read operation, when the data that the host intends to read are in the fault disk, a RAID controller has to get the other data and parity from the existent disks and performs recovery of lost data. Since the host 311 wants to take back the data in fault disks only which was buffered in buffer P 3431 after rebuilding action, it is not necessary to save the recovered data back to the local memory 342. The OTFXOR circuit 343 can be the source to perform DMA transferring of recovered data to the host 311 directly (as the dash-dot line shown in FIG. 4(b)). The advantages mentioned in the above OTFXOR improved proposal are also beneficial as the OTFTP circuit does. For write operation, the amount of using internal bus (including the amount of moving data between host and local memory) can be reduced to 2N+M. For read operation, the amount of using internal bus (including the amount of moving data between host and local memory) can be reduced to 2N. The amount of using internal bus is decreased M times for both operations.

Figure 6:
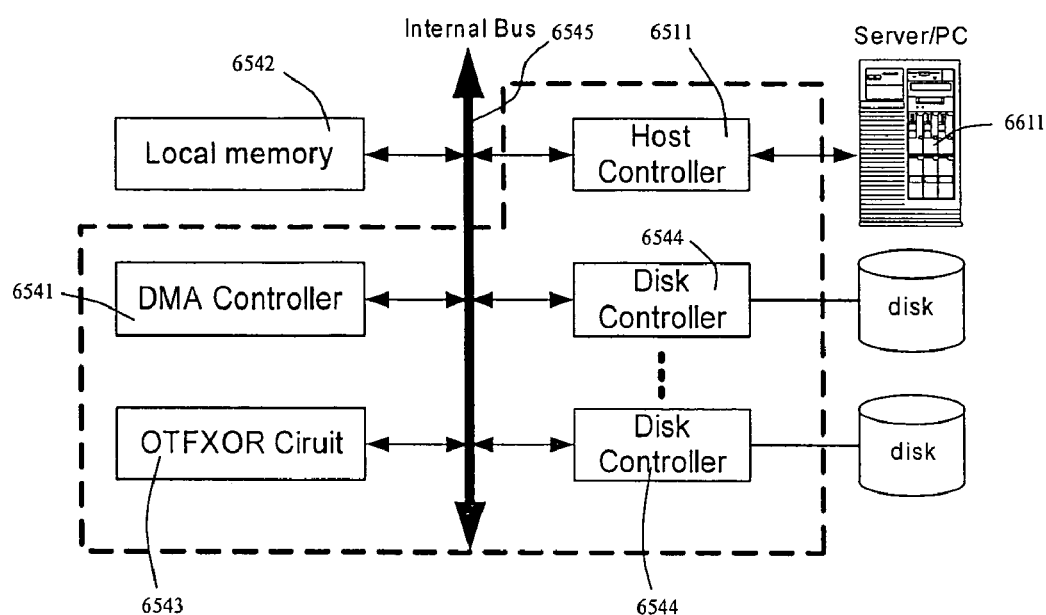
FIG. 6 is a block diagram of a RAID ASIC chip according to the present invention.

Please refer to FIG. 6 which is a block diagram of a RAID ASIC chip according to the present invention. The RAID ASIC chip of the present invention is designed by ACCUSYS, Inc. and shown in dot lines. The RAID ASIC chip contains a host controller 6511, a DMA controller 6541, an OTFXOR circuit 6543, disk controllers 6544 and an internal bus 6545. An interface of the RAID ASIC chip to server/PC or disk is IDE. An ATA-133 hard-drive is supported for each IDE channel. An internal bus 6545 is specific for this architecture (The internal bus 6545 is neither PCI local bus nor other industrial standard bus), and has a command bus (CMD bus) and a direct memory access bus (DMA bus). Hardware XOR is to support the on-the-fly XOR operation. For host controller 6511, a host IDE channel controller follows ATA-6 specification. A command block register set is built to receive host commands. For disk controller 6544, a disk IDE channel controller follows ATA-6 specification. The disk IDE channel controller includes a timing control register and IDE port register. The OTFXOR circuit 6543 uses an XOR buffer to do XOR operation. It works with 1K dual-port SRAM to access read and write data at the same time. To achieve the on-the-fly feature, the OTFXOR circuit 6543 must be cooperated with each disk controller 6544. The DMA controller 6541 arbitrates internal bus 6545 for direct access memory. The DMA controller 6541 includes DMA address register, count register, and some DMA control registers.

Figure 7:
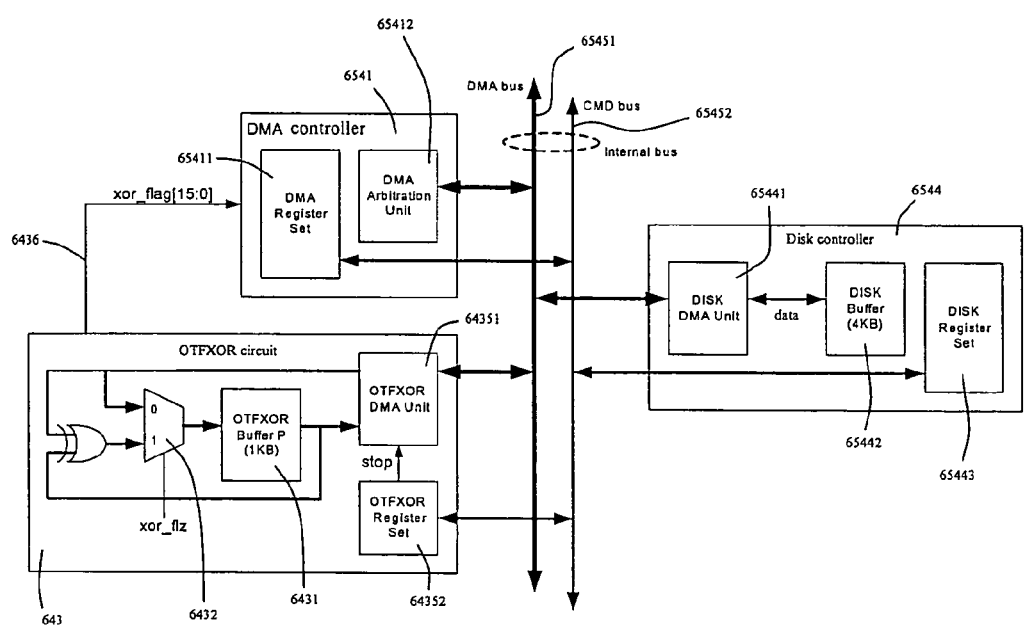
FIG. 7 is a block diagram of FIG. 6 according to the present invention.

Please refer to FIG. 7, which is a block diagram of FIG. 6 according to the present invention. The block diagram of FIG. 6 contains a DMA controller 6541, an OTFXOR circuit 643 and a disk controller 6544. The DMA controller 6541 contains a DMA register set 65411 and a DMA arbitration unit 65412. The OTFXOR circuit 643 contains an OTFXOR DMA unit 64351, an OTFXOR buffer 6431, a multiplexer 6432, an XOR component 6433 and an OTFXOR register set 64352. The disk controller 6544 contains a disk DMA 65441, a disk buffer 65442 and a disk register set 65443. In FIG. 7, a signal 6436, i.e., xor_flag[15:0], is transmitted from the OTFXOR circuit 643 to the DMA controller 6541 and has 16-bit pins of data representing:

Bit 0: enable channel 1 write XOR operation

Bit 1: enable channel 1 read XOR operation

Bit 2: enable channel 2 write XOR operation

Bit 3: enable channel 2 read XOR operation

Bit 4: enable channel 3 write XOR operation

Bit 5: enable channel 3 read XOR operation

Bit 6: enable channel 4 write XOR operation

Bit 7: enable channel 4 read XOR operation

Bit 8: enable channel 5 write XOR operation

Bit 9: enable channel 5 read XOR operation

Bit 10: enable channel 6 write XOR operation

Bit 11: enable channel 6 read XOR operation

Bit 12: enable channel 7 write XOR operation

Bit 13: enable channel 7 read XOR operation

Bit 14: enable channel 8 write XOR operation

Bit 15: enable channel 8 read XOR operation

The following descriptions explains the programming sequence to enable the on-the-fly XOR operation. This ASIC chip uses an on-the-fly XOR operation to calculate disk parity. The on-the-fly XOR can reduce memory access time. The on-the-fly XOR uses disk DMA to access data. The OTFXOR circuit 643 peeks internal bus when disk data are transferring and controls data transfer to a block size to calculate parity value.

Step 1: program each disk controller's register with appropriate values.

(a) direct I/O access IDE DATA register (b) direct I/O access IDE Error register/Feature register (c) direct I/O access sector count register (d) direct I/O access sector number register (e) direct I/O access cylinder low register (f) direct I/O access cylinder high register (g) direct I/O access device/head register (h) direct I/O access command/status register Step 2: program DMA controller's registers with appropriate values.

Step 3: program OTFXOR circuit's registers with appropriate values.

Step 4: program each disk controller's register to enable DMA transfer.

Operation steps of OTFXOR operation: After programming the registers within each module, the following actions are taken.

Figure 8:
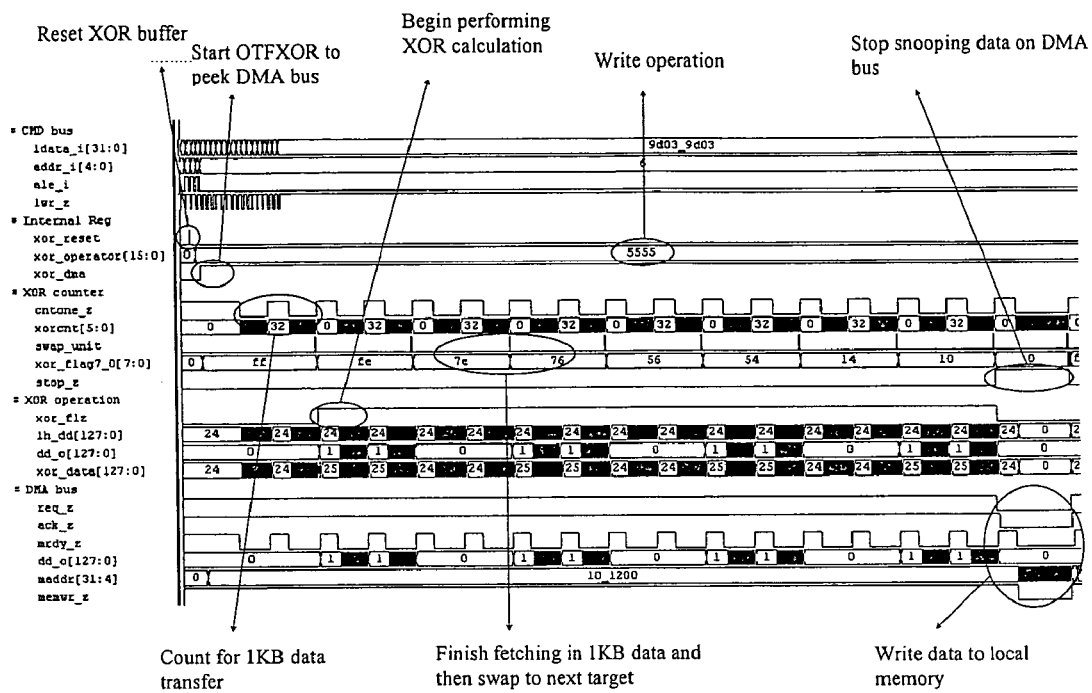
FIG. 8 is a timing diagram of 1KB XOR calculation according to the present invention.

(A) For write operation (please refer to FIG. 8)
  1. DMA controller reads data from a local memory.
  2. OTFXOR circuit peek the data on DMA bus while data are transferring from the local memory to a disk controller. Only one disk controller was enabled to do DMA transfer.
  3. Since there is only 1 KB buffer in OTFXOR circuit but 4 KB buffer space in the disk controller, it is necessary to block the DMA transfer when reach the high-water mark of XOR buffer, and the xor_flag is used for signaling the DMA controller to stop current transfer and converts to next disk target.
  4. When the action of swapping to the next disk target was done, the DMA transfer form the local memory to the disk controller started again. At the same time, the OTFXOR circuit performs XOR calculation.
  5. Until all DMA transfers to every assigned disk channel were done, the XOR DMA unit would be received a signal by stop to request DMA bus to write parity information to disk.

(B) For read operation
  1. DMA controller reads data from disk channel.
  2. The OTFXOR circuit peeks the data on DMA bus while data are transferring from the disk controller to the local memory. Only one disk controller was enabled to do DMA transfer.
  3. Since there is only 1 KB buffer in the OTFXOR circuit but 4 KB buffer space in the disk controller, it is necessary to block the DMA transfer when reach the high-water mark of an XOR buffer, and the xor_flag is used for signaling the DMA controller to stop current transfer and changes to next disk target.

4. When the action of swapping to next disk target was done, the DMA transfer from disk controller to the local memory started again. At the same time, the OTFXOR circuit performs XOR calculation to recover the lost data.

5. Until all DMA transfers to every assigned disk channel were done, the XOR DMA unit would be signaled by stop to request DMA bus to write parity information to the local memory.

Figure 9:
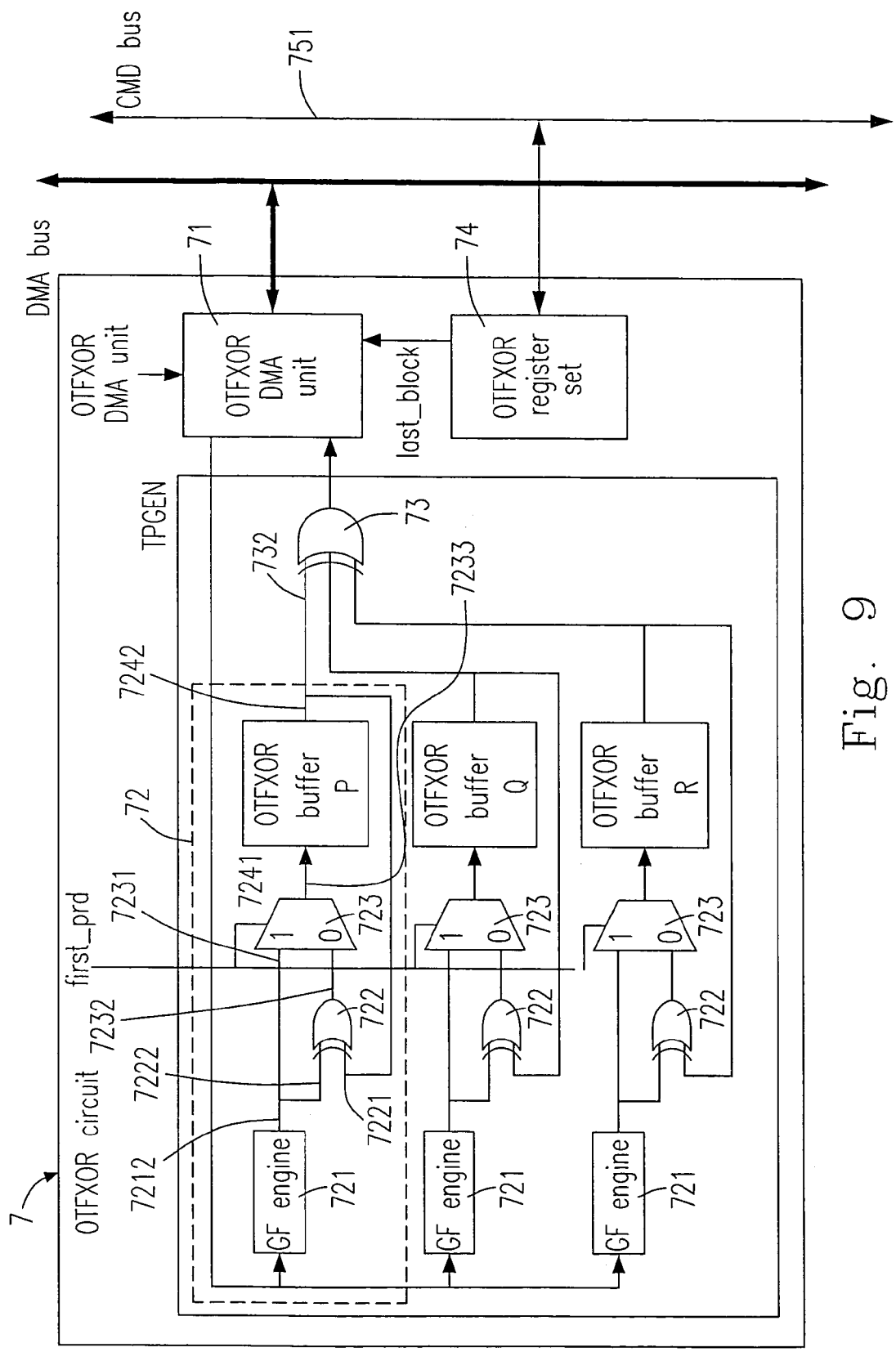
FIG. 9 is a circuit diagram of three-parity calculation circuit during operation according to the present invention.

The detailed block diagram of three-parity OTFTP circuit (on-the-fly three parity circuit) is shown in FIG. 9. The block diagram of the three-parity OTFTP circuit contains a OTFXOR DMA unit 71, a plurality of Galois field data recovery circuits 72, a first XOR component 73 and an OTFXOR register set 74. Galois field data recovery circuit 72 is to generate a parity and recovered data by using Galois field arithmetic in order to calculate the recovered data using the lost data and to output Galois output data. The first XOR component 73 is used to received the Galois output data from a plurality of Galois field data recovery circuits 72 and has a first XOR output terminal 731 and a plurality of first XOR input terminals 732 to generate an XOR output data and to transfer to the OTFXOR DMA unit 71. The OTFXOR register set 74 is used to control the OTFXOR DMA unit 71 according to a controlling signal from the CMD bus 751.

The Galois field data recovery circuit 72 contains a plurality of Galois field data recovery unit which comprises a Galois field engine 721, a second XOR component 722, a multiplexer 723 and an XOR buffer 724. The Galois field engine 721 is used for executing Galois field multiplication and Galois field division and has an engine output terminal 7212 and an engine input terminal 7211 which is electrically coupled to the XOR DMA unit 71. The second XOR component 722 has a first component input terminal 7221, a second component input terminal 7222 and a second XOR output terminal 7223, wherein the first component input terminal 7221 is electrically coupled to the engine output terminal 7212. The multiplexer 723 has a first multiplexer input terminal 7231, a second multiplexer input terminal 7232 and a multiplexer output terminal 7233, wherein the first multiplexer input terminal 7231 is electrically coupled to the engine output terminal 7212 and the second multiplexer input terminal 7232 is electrically coupled to the second XOR output terminal 7223. The XOR buffer 724 has a buffer input terminal 7241 and a buffer output terminal 7242, wherein the buffer input terminal 7241 is electrically coupled to the multiplexer output terminal 7233, the buffer output terminal 7242 is electrically coupled to the second component input terminal 7221 and the first XOR component input terminal 732, the XOR buffer 7242 is used for storing a parity and recovered data, and the Galois field data recovery circuit 72 is used for calculating multiple parity calculation.

Figure 10:
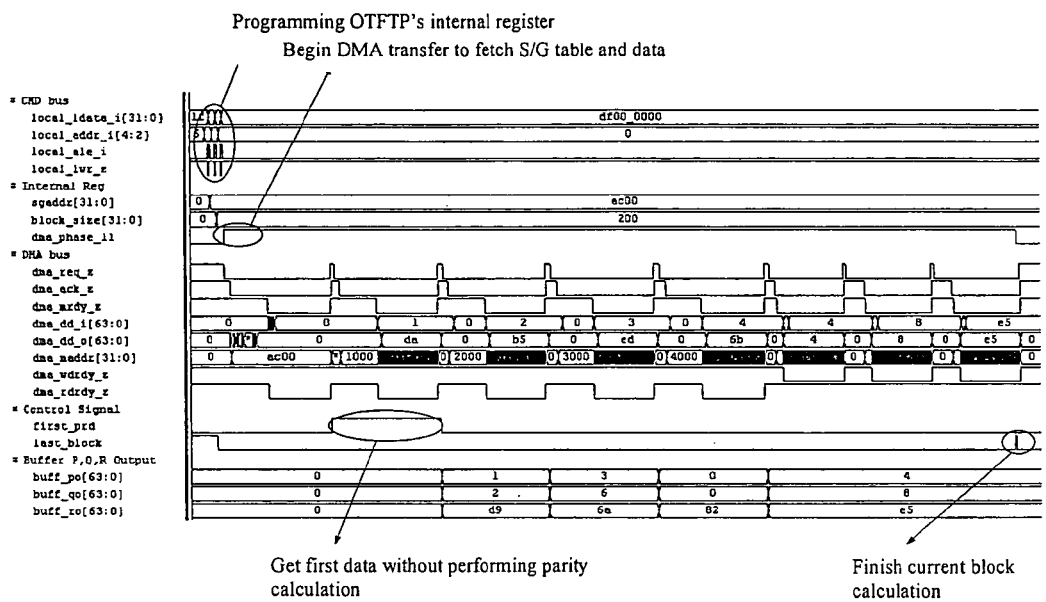
FIG. 10 is a timing diagram showing the three-parity calculation of the present invention.

Please refer to FIG. 10. The programming sequence of enabling three-parity calculation is explained as follows:

1. program SG_ADDRESS register to indicate which memory location has Scatter/Gather Table. There is some information stored in SG table including DMA address, non-fault disk number and Read/Write indicator.
   i. DMA address records the start address of the data which is ready for transferring.
   ii. Non-fault disk number—the reading disk no.
   iii. Read/Write indicator records whether the current transfer is at read or write stage.
2. program BLK_SIZE register to indicate how large the data is intended to be calculated.
3. program PARAM register to indicate what type of calculation will be used, they are the possible combinations of calculate P, Q, R and Data, in which, P, Q, R, are the pronoun of the first parity, second parity and the third parity separately. For example, calculate PRD means to calculate first parity, third parity and Data.

Operation steps: After programming the OTFTP circuit's internal registers, the following actions are taken. 1. Read S/G table from the local memory. 2. Read or peek the busing data on DMA bus and calculate parity and save them in internal buffers. 3. Write parity information to the local memory.

With respect to principle of the Galois field engine, it is one method to use the algebra of Galois field arithmetic to recover data with multiple failures of disks. The Galois field arithmetic is an integer number which is converted into a Galois field number in order to perform Galois field addition, Galois field subtraction and, Galois field multiplication and Galois field division. The algebra of Galois field is as follows:

1. The addition (+) is represented by bitwise XOR.
2. Addition and subtraction are the same operation, that is, A+B=A−B.
3. The additive identity element (0) is represented by Gf(0). A number in Gf( ) is a Galois field element in hexadecimal representation; a number without Gf( ) is a conventional integer.
4. A+A=A−A=Gf(0)
5. The multiply operation can be expressed as exponential addition, that is, Gf(A) plus Gf(B).
6. The division operation can be expressed as exponential subtraction, that is, Gf(A) minus Gf(B).

To achieve recovery of multiple failure disks, more than one parity can be obtained by a generator polynomial. An example of a generator polynomial which can generate two parities information is illustrated as follows:

$$\begin{cases} P = \sum_{i}^{n} p_i X_i \\ Q = \sum_{i}^{n} q_i X_i \end{cases}$$

In which, P is one parity, and Q is another parity information. $p_i$ and $q_i$ are coefficient, $p_i$ is equal to one and $q_i$ stands for disk number. $X_i$ is a data word. In GF engine, the operation is as follows. Step 1: to convert conventional integer into Galois field number. Step 2: to latch coefficients $p_i$ and $q_i$. Step 3: to perform Galois field multiplication and Galois field division, i.e. the addition and subtraction in the Galois field operation. Step 4: to convert the Galois field number back to the conventional integer.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An XOR circuit comprising:
   an XOR DMA unit for accessing data from a DMA bus;
   a plurality of Galois field data recovery circuits for generating a parity and recovered data by using Galois field arithmetic from old data in order to calculate the recovered data from lost data to output a Galois output data;

a first XOR component for inputting the Galois output data into the first XOR component from the Galois field data recovery circuits and having a first XOR output terminal and a plurality of first XOR input terminals to generate an XOR output data which are transferred to the XOR DMA unit; and an XOR register set for controlling the XOR DMA unit by a control signal from a command bus.

2. The XOR circuit according to claim 1, wherein the Galois field data recovery circuit comprises a plurality of Galois field data recovery units which comprising:

a Galois field engine for executing Galois field multiplication and Galois field division and having an engine output terminal and an engine input terminal which is electrically coupled to the XOR DMA unit;

a second XOR component having a first component input terminal, a second component input terminal and a second XOR output terminal, wherein the first component input terminal is electrically coupled to the engine output terminal;

a multiplexer having a first multiplexer input terminal, a second multiplexer input terminal and a multiplexer output terminal, wherein the first multiplexer input terminal is electrically coupled to the engine output terminal and the second multiplexer input terminal is electrically coupled to the second XOR output terminal; and an XOR buffer having a buffer input terminal and a buffer output terminal, wherein the buffer input terminal is electrically coupled to the multiplexer output terminal, the buffer output terminal is electrically coupled to the second component input terminal and the first XOR component input terminal, the XOR buffer is used for storing a parity and recovered data, and the Galois field data recovery circuit is used for calculating multiple parity calculation.

3. The XOR circuit according to claim 1, wherein the XOR buffer is an SRAM.

4. A RAID device capable of recovering a plurality of failures comprising:

a host controller having a command register for receiving a host command;

at least one disk controller having a timing control register and an IDE port register;

an XOR circuit of claim 1 for executing XOR calculation;

a DMA controller for arbitrating direct access of an internal bus; and a local memory for storing a data from the internal bus.

5. The RAID device according to claim 4, wherein the DMA controller have a DMA address register, count register and a plurality of control register.

* * * * *